April 24, 1951 J. B. PARSONS 2,550,591
TUBE FITTING ASSEMBLY
Filed Oct. 15, 1948
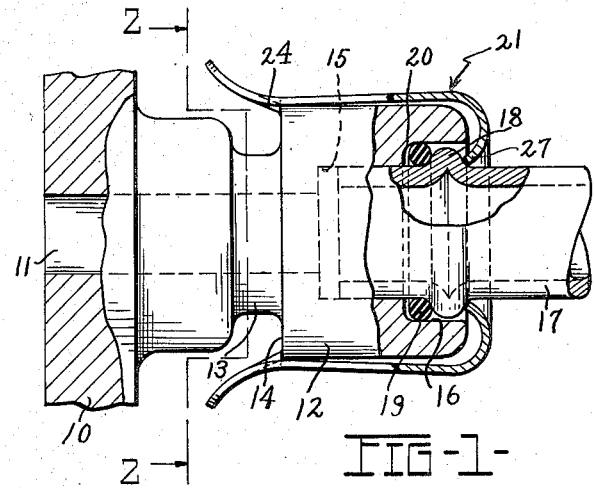
FIG-1-
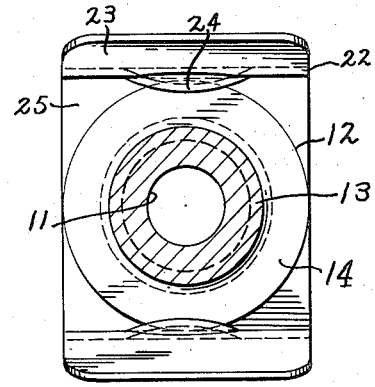
FIG-2-
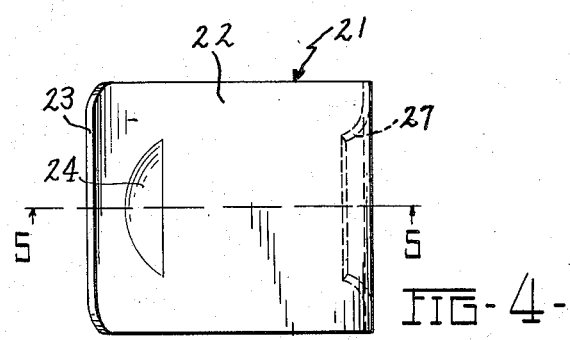
FIG-4-
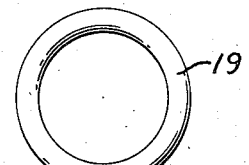
FIG-3-
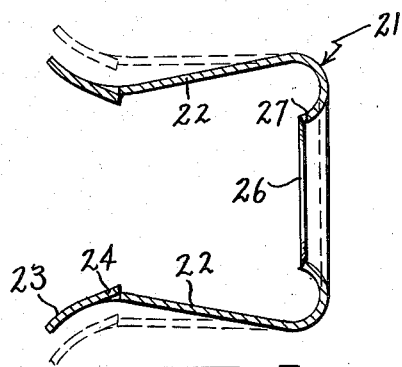
FIG-5-
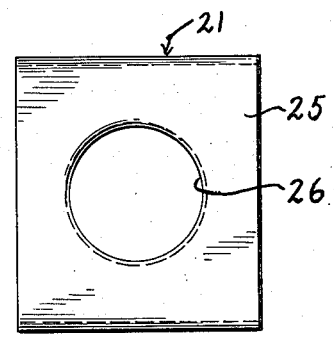
FIG-6-
INVENTOR.
JOHN B. PARSONS
BY
ATTY.

Patented Apr. 24, 1951

2,550,591

UNITED STATES PATENT OFFICE 2,550,591

TUBE FITTING ASSEMBLY

John B. Parsons, Maumee, Ohio, assignor to Malcolm W. Fraser, Toledo, Ohio, trustee Application October 15, 1948, Serial No. 54,791

5 Claims. (Cl. 285—174)

This invention relates to pipe couplings, but particularly to tube fitting assembles employing relatively thin-walled tubing.

An object is to produce a simple and efficient coupling for thin-walled pipe by which the pipe or tube may be quickly attached to a body part without the use of screw-threaded connections, and in such manner as to produce a reliable and efficient liquid-tight connection.

Another object is to produce a new and improved coupling particularly adapted for thin-walled tubing which can be quickly and reliably connected and disconnected, which eliminates the use of the relatively expensive parts such as screw-threaded glands and members requiring close tolerances; and which, in a simple manner, effects a liquid-tight seal.

Other objects and advantages of the invention will hereinafter appear, and for purposes of illustration but not of limitation, an embodiment of the invention is shown in the accompanying drawings, in which Figure 1 is a fragmentary side elevation partly in section, showing the coupling assembly;

Figure 2 is a transverse sectional elevation substantially on the line 2—2 of Figure 1;

Figure 3 is a plan view of the rubber-like sealing ring;

Figure 4 is a side elevation of the retainer clip;

Figure 5 is a sectional view on the line 5—5 of Figure 4; and

Figure 6 is an end elevation of the retainer clip.

The illustrated embodiment of the invention comprises a body member 10 which may be a die casting and which is provided with a longitudinally extending passage 11 which is open at its outer end. The body member 10 terminates in an enlarged annular portion 12 connected to the adjacent portion by a reduced neck 13 providing a substantially flat annular shoulder 14 at the inner end of the annular portion 12. The outer end of the longitudinal passage 11 terminates in an enlarged annular socket 15 and at the free end of the annular portion 12 is an enlarged annular cavity 16.

17 represents a relatively thin-walled tube of copper, brass or the like, through which liquid under pressure passes to the body member 10. The tube 17 is annular in cross section and of such outside diameter as to fit slidingly the socket portion 15 of the annular portion 12. Thus the free end portion of the tube 17 serves as a pilot to have a relatively free sliding fit within the socket 15. Formed on the tubing a short distance from the free end thereof is an external annular bead or collar 18 which may be formed by holding the adjacent portions of the tube and forcing these portions toward each other to cause the metal to flow outwardly into a bead formation. The location of the bead away from the free end of the tube 17 is not critical so long as the bead enters the annular cavity 16. It should further be noted that it is not necessary that the free end of the tube bottom against the inner end of the socket 15.

The bead 18 extends laterally beyond the side walls of the tubing a short distance and although it is not important that the outer surface of the bead engage the side walls of the cavity 16, it is necesary only that the bead may pass freely into the cavity 16. Surrounding the tubes 17 in advance of the bead 18 is an annular packing ring 19 of rubber-like material and having characteristics of resilience and compressibility, such rings being ordinarily referred to as O rings. The ring 19 preferably is of a diameter slightly greater than the distance between the outer surface of the tube 17 and the side walls of the cavity 16 so as to be compressed when the tube is forced into the cylindrical portion 12 of the body member. As shown, the corner portion 20 of the cavity 16 is rounded and provides a shoulder for limiting the inward movement of the O ring 19.

In order to hold the tube 17 against retrograde movement or movement away from its coupled position, a spring metal retainer 21 is employed. The retainer 21 is of spring sheet metal of U shape, providing a pair of inwardly inclined arms 22, the free ends of which curve outwardly as indicated at 23. Struck from each of the arms 22 adjacent the curved ends are tongues 24, the free edges of which extend inwardly and which are adapted to engage the flat shoulder 14 adjacent the inner end of the cylindrical body portion 12. Integrally connecting the two arms 22 is a substantially flat body portion 25 having a central opening 26 formed by an inwardly extending annular flange portion 27 which abuts against the outer side portion of the bead 18 and holds it against retrograde movement, thereby holding the rubber-like sealing ring 19 in sealing engagement with the adjacent surfaces.

Manifestly, in assembling the parts, the tube 17 is slid into the socket 15, the sealing ring 19 first having been applied against the inner side of the bead 18. The retainer 21 is then forced over the cylindrical body portion 12 until the tongues 24 snap into engagement with the shoulder 14. The coupling is thereby formed and produces an exceedingly satisfactory, inexpensive and liquid-tight seal. Manifestly, any liquid under pressure which may seep between the outer end portion of the tube 17 and the walls of the socket 15 impinge against the inner portion of the O ring 19 and urge it into more intimate sealing engagement.

It is to be understood that numerous changes in details of construction, arrangement and operation may be effected without departing from the spirit of the invention especially as defined in the appended claims.

What I claim is:

1. A tube connection comprising a thin-walled metal tube, an integral outwardly extending peripheral collar on said tube adjacent one end thereof but spaced a short distance therefrom, the end portion of said tube beyond said collar being of substantially uniform diameter, a hollow body member having an inner wall defining a passage therein communicating with said tube, the end portion of said tube having a sliding engagement in a portion of said inner wall, an enlarged annular cavity contiguous to the outer end of said last passage portion to receive said collar, a rubber-like ring round in cross section interposed between the tube and the side wall of the cavity and arranged at the inner side of said collar, a substantially U-shaped spring metal clip having a portion abutting the outer side of said collar, and struck-out tongues on said clip engaging the outer surface of said body member.

2. A tube connection comprising a thin-walled metal tube, an external annular bead on said tube adjacent one end thereof but spaced a short distance therefrom, the end portion of said tube beyond said collar being of substantially uniform diameter, a hollow body member having an inner wall defining a passage therein communicating with said tube, the end portion of said tube having a sliding engagement in a portion of said inner wall, an enlarged annular cavity contiguous to the outer end of said last passage portion to receive said bead, a rubber-like ring round in cross section interposed between the tube and the side wall of the cavity and arranged at the inner side of said bead, a sheet metal retainer on said body member, a portion of said retainer engaging the outer side of said bead, and finger means on said retainer engaging said body member for cooperating with said retainer portion to prevent outward movement of the tube from the body member.

3. A tube connection comprising a thin-walled metal tube, an external annular bead on said tube adjacent one end thereof but spaced a short distance therefrom, the end portion of said tube beyond said collar being of substantially uniform diameter, a hollow body member having an inner wall defining a passage therein communicating with said tube, external shoulder means on said body member, the end portion of said tube having a sliding engagement in a portion of said inner wall, an enlarged annular cavity contiguous to the outer end of said last passage portion to receive said bead, a rubber-like ring round in cross section interposed between the tube and the side wall of the cavity and arranged at the inner side of said bead, a sheet metal retainer on said body member, a portion of said retainer engaging the outer side of said bead, and finger means on said retainer engaging the external shoulder means of said body member for cooperating with said retainer portion to prevent outward movement of the tube from the body member.

4. A tube connection comprising a thin-walled metal tube, an integral outwardly extending peripheral collar on said tube adjacent one end thereof but spaced a short distance therefrom, the end portion of said tube beyond said collar being of substantially uniform diameter, a hollow body member having an inner wall defining a passage therein communicating with said tube, the end portion of said tube having a sliding engagement in a portion of said inner wall, an enlarged annular cavity contiguous to the outer end of said last passage portion to receive said collar, a rubber-like ring round in cross section interposed between the tube and the side wall of the cavity and arranged at the inner side of said collar, a spring metal retainer having a portion abutting the outer side of said collar, and means on said retainer impinging against the outer surface of said body member for cooperating with said retainer portion to prevent outward movement of the tube from the body member.

5. A tube connection comprising a thin-walled metal tube, an external annular bead on said tube adjacent one end thereof but spaced a short distance therefrom, the end portion of said tube beyond said collar being of substantially uniform diameter, a hollow body member having an inner wall defining a passage therein communicating with said tube, the end portion of said tube having a sliding engagement in a portion of said inner wall, an enlarged annular cavity contiguous to the outer end of said last passage portion to receive said bead said body member having an outwardly facing shoulder at the inner end of said enlarged annular cavity, a rubber-like ring round in cross section interposed between the tube and the side wall of the cavity and arranged between the inner side of said bead and said shoulder, a sheet metal retainer on said body member, an inwardly extending flange portion of said retainer engaging the outer side of said bead, and means on said retainer engaging said body member for cooperating with said flange portion to prevent outward movement of the tube from the body member.

JOHN B. PARSONS.

REFERENCES CITED

The following references are of record in the file of this patent:

UNITED STATES PATENTS

| Number | Name | Date |
| --- | --- | --- |
| 1,173,211 | O'Donnell | Feb. 29, 1916 |
| 1,848,198 | Reid | Mar. 8, 1932 |
| 1,966,718 | Hanson | July 17, 1934 |
| 2,004,967 | Williams | June 18, 1935 |
| 2,212,745 | McIntosh | Aug. 27, 1940 |
| 2,336,656 | Van Uum | Dec. 14, 1943 |